(12) United States Patent
Mitsuishi et al.

(10) Patent No.: US 11,009,075 B2
(45) Date of Patent: May 18, 2021

(54) BEARING DEVICE FOR VEHICLE WHEEL

(71) Applicant: NTN CORPORATION, Osaka (JP)

(72) Inventors: Tadashi Mitsuishi, Iwata (JP); Motohiro Tada, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/760,442

(22) PCT Filed: Sep. 14, 2016

(86) PCT No.: PCT/JP2016/077101
§ 371 (c)(1),
(2) Date: Mar. 15, 2018

(87) PCT Pub. No.: WO2017/047637
PCT Pub. Date: Mar. 23, 2017

(65) Prior Publication Data
US 2018/0258995 A1 Sep. 13, 2018

(30) Foreign Application Priority Data

Sep. 16, 2015 (JP) .............................. JP2015-183485

(51) Int. Cl.
*F16C 33/78* (2006.01)
*F16C 33/80* (2006.01)
(Continued)

(52) U.S. Cl.
CPC ........ *F16C 33/782* (2013.01); *B60B 27/0073* (2013.01); *F16C 19/18* (2013.01);
(Continued)

(58) Field of Classification Search
CPC .............. F16C 33/7876; F16C 33/7879; F16C 33/7883; F16C 2326/02; F16C 19/18;
(Continued)

(56) References Cited

U.S. PATENT DOCUMENTS 5,813,675 A 9/1998 Otto
7,675,212 B2 * 3/2010 Kobayashi ............ F16J 15/326
277/317

(Continued)

FOREIGN PATENT DOCUMENTS

CN 1957187 5/2007
CN 102102762 6/2011
(Continued)

OTHER PUBLICATIONS

Machine Translation of JP 2005-337423 (Year: 2005).*
(Continued)

*Primary Examiner* — Alan B Waits
(74) *Attorney, Agent, or Firm* — Wenderoth, Lind & Ponack, L.L.P.

(57) ABSTRACT

A bearing device for a vehicle wheel is provided with: an outer member; an inner member; a ball row; and a seal member for sealing the space between the outer member and the inner member due to a seal plate in which a sealing lip is formed being fitted into an opening in the outer member, a slinger being fitted on the inner member, and the sealing lip coming into contact with the slinger; wherein the slinger is formed so as to cover the end surface of the opening in the outer member, the slinger is provided with a cylindrical wall part extending in the axial direction of the inner member, a labyrinth is configured between the slinger and the end surface of the opening in the outer member, and another labyrinth is configured by the wall part being disposed between the outer member and the sealing lip.

8 Claims, 10 Drawing Sheets

(51) Int. Cl.
*F16J 15/32* (2016.01)
*F16C 19/18* (2006.01)
*F16C 33/58* (2006.01)
*F16J 15/3264* (2016.01)
*F16J 15/447* (2006.01)
*B60B 27/00* (2006.01)
*F16C 41/00* (2006.01)

(52) U.S. Cl.
CPC .......... *F16C 19/186* (2013.01); *F16C 33/586* (2013.01); *F16C 33/7883* (2013.01); *F16C 33/805* (2013.01); *F16J 15/3264* (2013.01); *F16J 15/4476* (2013.01); *F16C 41/007* (2013.01); *F16C 2326/02* (2013.01)

(58) Field of Classification Search
CPC ...... F16C 19/186; F16C 33/586; F16C 33/80; F16C 33/805; F16C 33/782; F16C 33/7886; F16C 41/007; F16J 15/326; F16J 15/3256; F16J 15/3284; F16J 15/3265; F16J 15/4476; B60B 2380/12; B60B 27/0073
See application file for complete search history.

(56) References Cited

U.S. PATENT DOCUMENTS

| | | | |
|---|---|---|---|
| 8,628,248 B2 | 1/2014 | Walter et al. | |
| 2006/0125189 A1* | 6/2006 | Peschke | F16C 21/005 277/349 |
| 2008/0199120 A1 | 8/2008 | Torii et al. | |
| 2009/0058011 A1* | 3/2009 | Shibayama | B60B 27/0005 277/361 |
| 2011/0150380 A1 | 6/2011 | Walter et al. | |
| 2014/0374996 A1* | 12/2014 | Duch | F16J 15/3232 277/562 |
| 2015/0014935 A1* | 1/2015 | Haepp | F16J 15/164 277/317 |
| 2015/0098670 A1* | 4/2015 | Gulli | F16J 15/3264 384/486 |
| 2018/0147886 A1* | 5/2018 | Morello | B60B 27/0005 |
| 2018/0156336 A1* | 6/2018 | Kato | F16J 15/3232 |

FOREIGN PATENT DOCUMENTS

| | | | |
|---|---|---|---|
| FR | 3018874 A1 * | 11/2007 | |
| FR | 2971570 A1 * | 8/2012 | |
| JP | 2001-510534 | 7/2001 | |
| JP | 2005-337423 | 12/2005 | |
| JP | 2007285374 A * | 11/2007 | ......... F16C 33/7883 |
| JP | 2010-91036 | 4/2010 | |
| JP | 2010-185465 | 8/2010 | |
| JP | 2012-102843 | 5/2012 | |
| JP | 2014-25566 | 2/2014 | |
| JP | 2015-14296 | 1/2015 | |
| JP | 2015-52350 | 3/2015 | |
| JP | 2015-110958 | 6/2015 | |

OTHER PUBLICATIONS

Machine Translation of JP 2010-185465 (Year: 2010).*
Machine Translation of JP 2007-285374 (Year: 2007).*
International Search Report dated Dec. 20, 2016 International (PCT) Application No. PCT/JP2016/077101.
Office Action dated May 5, 2019 in Chinese Patent Application No. 201680053029.3, with English translation.
Notice of Reasons for Refusal dated Oct. 8, 2019 in corresponding Japanese Patent Application No. 2015-183485 with English translation.

* cited by examiner

BEARING DEVICE FOR VEHICLE WHEEL

TECHNICAL FIELD

The present invention relates to a wheel bearing device. More particularly, the present invention relates to a wheel bearing device including a seal member in which labyrinths are formed.

BACKGROUND ART

Conventionally, a wheel bearing device which rotatably supports wheels in a suspension device of an automobile is known. In a wheel bearing device, a hub wheel (inner member) connected to wheels is rotatably supported by an outer member via a rolling element. When grease inside the outer member decreases or rainwater and dust intrudes in the wheel bearing device, the trajectory surface of the rolling element or the inner member is damaged and a bearing operational life shortens. Therefore, in order to prevent leakage of the grease sealed inside and prevent the intrusion of the rainwater and the dust from the outside, the wheel bearing device includes a seal member arranged between the outer member and the inner member.

In order to increase the bearing operational life, such a wheel bearing device includes a plurality of seal mechanisms provided on the seal member to improve a sealing property. A pack seal which is a seal member includes a seal of a seal lip and, in addition, a seal of a labyrinth. The pack seal employs such a configuration, so that the labyrinths suppress rainwater and dust from intruding the distal end of the seal lip, and can prevent damages of the distal end of the seal lip and improve the sealing property. Patent Document 1 discloses this example.

The wheel bearing device disclosed in Patent Document 1 includes an outer member having a tubular shape, an inner ring which forms an inner member, a rolling element which rotatably supports the inner ring, and a sealing member which seals the opening portion. The sealing member is formed by a pack seal in which a seal member fitted to the outer member and a slinger fitted to the inner ring are disposed to face each other. A bent portion in which an intermediate portion of the rising wall portion of the slinger protrudes in a cylindrical shape in the axial direction is formed on the sealing member. In the sealing member, a labyrinth along an axial direction is formed by disposing the bent portion between rubber seal portions of the seal member.

The bent portion formed on the slinger of the sealing member is bent so as to fold back the intermediate portion of the rising wall portion of the slinger along the axial direction. Further, a lip which forms the rubber seal portion of the seal member is in contact with the rising wall portion of the slinger. Therefore, the sealing member includes the bent portion formed on the rising wall portion of the slinger to move a contact position of the lip portion apart from the position of the bent portion by changing the shape of the lip portion without influencing a contact state of the rising wall portion of the slinger and the lip. However, the sealing cross section height of the pack seal, which is an interval between the outer member to which the sealing member is fitted and the inner ring, is limited by the inner diameter of the outer member and the outer diameter of the inner ring. For this reason, the technique disclosed in Patent Document 1 is disadvantageous in that formation of the labyrinth limits the degree of freedom of the lip design.

PRIOR ART DOCUMENT

Patent Document

Patent Document 1: JP-A 2010-91036 Gazette

SUMMARY OF THE INVENTION

Problems to be Solved by the Invention

The present invention has been made in view of the above circumstances. An object of the present invention is to provide a wheel bearing device which can form a labyrinth without limiting the degree of freedom of seal lip design and improve a sealing property.

Solutions to the Problems

A wheel bearing device according to the present invention includes: an outer member which includes double row outer raceway surfaces integrally formed on an inner circumferential surface;
    an inner member which includes double row inner raceway surfaces formed on an outer circumferential surface and facing the double row outer raceway surfaces; double row rolling elements which are rollably housed between the double row outer raceway surfaces and the double row inner raceway surfaces; a seal member which seals between the outer member and the inner member when a seal plate on which a seal lip is formed is fitted into an opening portion of the outer member, a slinger is fitted to an outer circumferential portion of the inner member to face the seal plate, and the seal lip contacts the slinger,
    and the slinger is formed so as to cover an end surface of the opening portion of the outer member, the slinger is provided with a wall portion having a cylindrical shape and extending along an axial direction of the inner member, a labyrinth is formed between the end surface of the opening portion of the outer member and the slinger, and the wall portion is disposed between the outer member and the seal lip to form another labyrinth.

In the wheel bearing device according to the present invention, an outer diameter of a distal end of the wall portion is preferably formed to have a size equal to or more than an outer diameter of a base end of the wall portion.

In the wheel bearing device according to the present invention, the wall portion is preferably formed apart from an axial center in the axial direction from a base end to a distal end in a cross-sectional view including the axial direction.

In the wheel bearing device according to the present invention, an annular recessed portion or protrusion portion along a circumferential direction is preferably formed on the wall portion.

In the wheel bearing device according to the present invention, a distal end of the seal plate is preferably formed so as to be located closer to a side of the base end than the distal end of the wall portion.

In the wheel bearing device according to the present invention, preferably, an outer groove along the circumferential direction is formed on an outer circumferential surface of the outer member, and a cover portion which has a cylindrical shape and covers the outer groove is formed on the slinger.

Effects of the Invention

According to the wheel bearing device of the present invention, the wall portion is disposed between the fitting portion of the seal plate and the seal lip without changing the seal plate. This makes it possible to form the labyrinth while maintaining the degree of freedom of the seal lip design, and improve the sealing property.

According to the wheel bearing device of the present invention, the labyrinth in which rainwater and dust hardly intrude is formed. This makes it possible to form the labyrinth while maintaining the degree of freedom of the seal lip design, and improve the sealing property.

According to the wheel bearing device of the present invention, the labyrinth in which intruding rainwater and dust are easily discharged is formed. This makes it possible to form the labyrinth while maintaining the degree of freedom of the seal lip design, and improve the sealing property.

Even when rainwater and dust intrude inside getting over the labyrinth, the wheel bearing device of the present invention suppresses adhesion of the rainwater and the dust to the seal lip of the seal plate. This makes it possible to form the labyrinth while maintaining the degree of freedom of the seal lip design, and improve the sealing property.

The wheel bearing device of the present invention suppresses the intrusion of the rainwater and the dust into the labyrinth without influencing the performance of the lip seal of the seal plate. This makes it possible to form the labyrinth while maintaining the degree of freedom of the seal lip design, and improve the sealing property.

EMBODIMENTS OF THE INVENTION

A wheel bearing device 1 which is a first embodiment of a wheel bearing device according to the present invention will be described below with reference to FIGS. 1 to 3.

Figure 1:
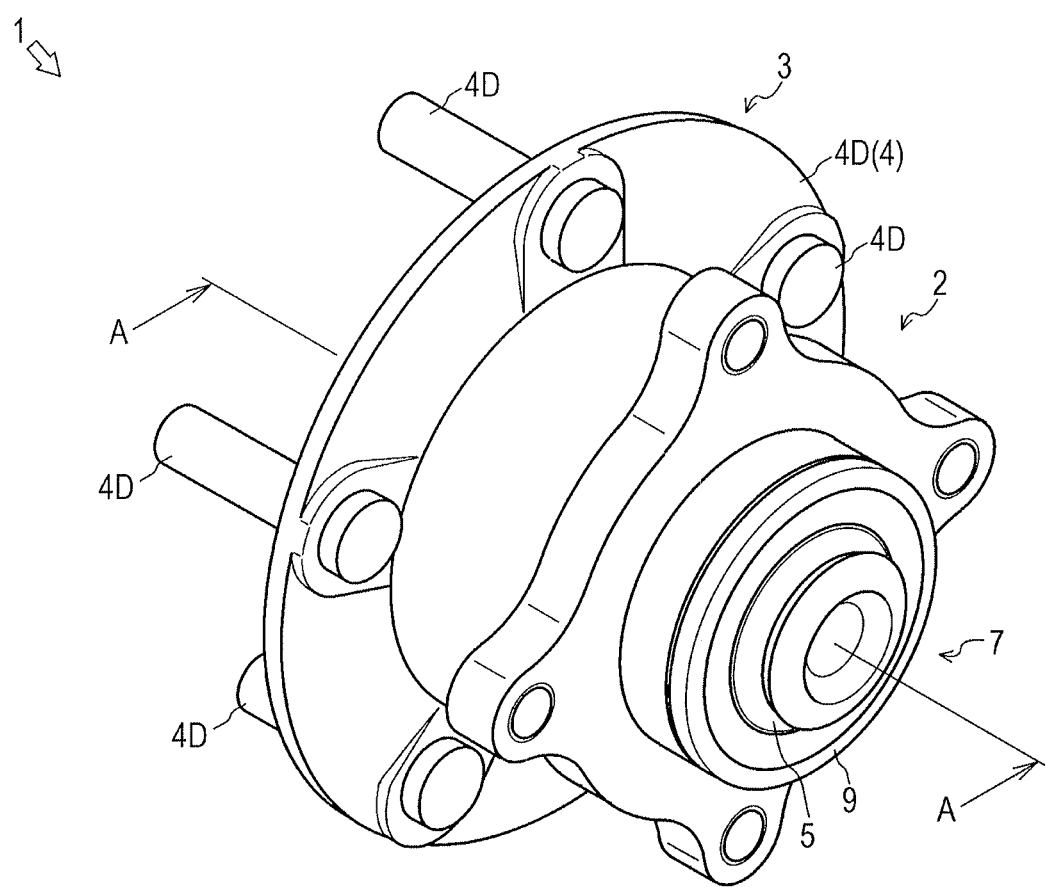
FIG. 1 is a perspective view showing an entire configuration of a wheel bearing device according to a first embodiment of the present invention.
Figure 2:
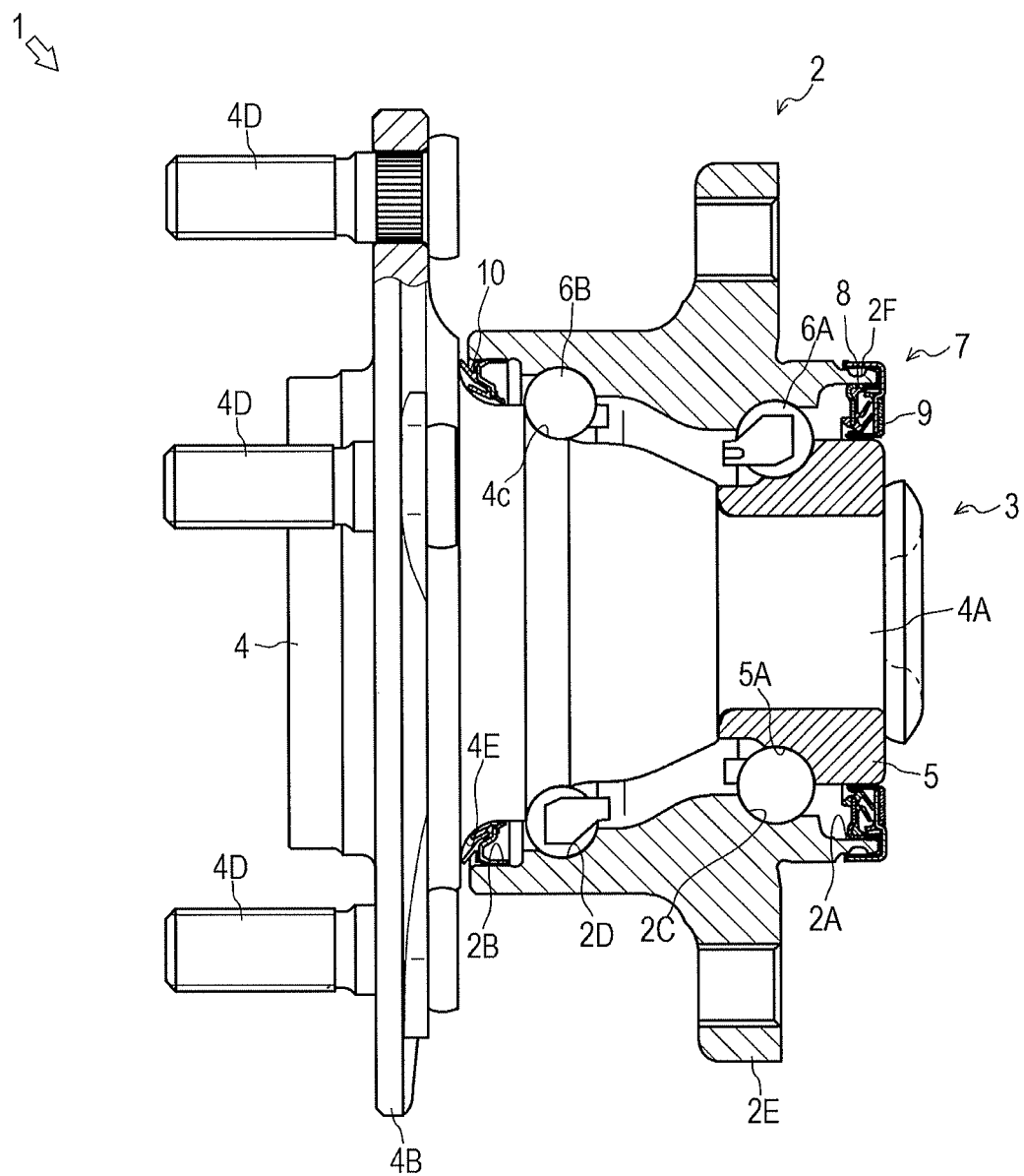
FIG. 2 is a cross-sectional view showing the entire configuration of the wheel bearing device according to the first embodiment of the present invention (see an arrow A view in FIG. 1).

As shown in FIGS. 1 and 2, the wheel bearing device 1 rotatably supports wheels in a suspension device of a vehicle such as an automobile. The wheel bearing device 1 includes an outer member 2, an inner member 3 (a hub wheel 4 and an inner ring 5), two rows of one side ball row 6A (see FIG. 2) and an other side ball row 6B (see FIG. 2) which are rolling rows, one side (inner side) seal member 7, and an other side (outer side) seal member 10 (see FIG. 2).

As shown in FIG. 2, the outer member 2 supports the inner member 3 (the hub wheel 4 and the inner ring 5). The outer member 2 has a substantially cylindrical shape and is made of medium to high carbon steel containing 0.40 to 0.80 wt % of carbon such as S53C. At a one side (inner side) end of the outer member 2, a one side opening portion 2A to which the one side seal member 7 can be fitted is formed. A drainage outer groove 2F is formed on the outer circumferential surface of the one side opening portion 2A. On the other side (outer side) end of the outer member 2, an other side opening portion 2B to which the other side seal member 10 can be fitted is formed. On the inner circumferential surface of the outer member 2, a one side outer raceway surface 2C having an annular shape and an other side outer raceway surface 2D are formed so as to be parallel to each other in the circumferential direction. The other side outer raceway surface 2D is formed such that the one side outer raceway surface 2C and a pitch circle diameter are equal or larger. A hardened layer having a surface hardness in a range of 58 to 64 HRC by induction hardening is formed on the one side outer raceway surface 2C and the other side outer raceway surface 2D. On the outer circumferential surface of the outer member 2, a vehicle body mounting flange 2E for mounting to a knuckle of the suspension device (not shown) is integrally formed.

The inner member 3 rotatably supports wheels of the vehicle (not shown). The inner member 3 is composed of the hub wheel 4 and the inner ring 5. The hub wheel 4 has a bottomed cylindrical shape and is made of medium to high carbon steel containing 0.40 to 0.80 wt % of carbon such as S53C. On a one side end (inner side) of the hub wheel 4, a small diameter step portion 4A of a reduced diameter is formed on the outer circumferential surface. On the other side end (outer side) of the hub wheel 4, a wheel mounting flange 4B for mounting the wheels is integrally formed. The wheel mounting flange 4B is provided with hub bolts 4D at circumferentially equidistant positions. An inner raceway surface 4C having an annular shape is formed on the other side outer circumferential surface of the hub wheel 4 in the circumferential direction.

The inner ring 5 which composes the inner member 3 is press-fitted into the small diameter step portion 4A of the one side end of the hub wheel 4. The inner ring 5 is made of high carbon chromium bearing steel such as SUJ2, and the inner ring 5 including the core portion has been hardened in the range of 58 to 64 HRC by immersion quenching. On the outer circumferential surface of the inner ring 5, an inner raceway surface 5A having an annular shape is formed in the circumferential direction. The inner ring 5 is integrally fixed to a one side end of the hub wheel 4 in a state where a predetermined preload is applied by the press fitting. That is, on one side of the hub wheel 4, the inner raceway surface 5A is formed by the inner ring 5. The hub wheel 4 is hardened to a surface hardness in a range of 58 to 64 HRC by induction hardening from the one side small diameter step portion 4A to the other side inner raceway surface 4C. Thereby, the hub wheel 4 has sufficient mechanical strength against a rotational bending load applied to the wheel mounting flange 4B, and the durability of the hub wheel 4 is improved. In the hub wheel 4, the inner raceway surface 5A formed on the inner ring 5 at one side end is disposed to face the one side outer raceway surface 2C of the outer member 2, and the inner raceway surface 4C formed on the other side is disposed to face the other side outer raceway surface 2D of the outer member 2.

The one side ball row 6A and the other side ball row 6B which are the rolling rows rotatably support the hub wheel 4. In the one side ball row 6A and the other side ball row 6B, a plurality of balls which are rolling elements are annularly held by a holder. The one side ball row 6A and the other side ball row 6B are made of high carbon chromium bearing steel such as SUJ2, and the one side ball row 6A and the other side ball row 6B including the core portions have been hardened in the range of 58 to 64 HRC by the immersion quenching. The other side ball row 6B is formed such that the one side ball row 6A and the pitch circle diameter are equal or larger. The one side ball row 6A is rollably sandwiched between the inner raceway surface 5A formed on the inner ring 5 and the one side outer raceway surface 2C of the outer member 2 facing the inner raceway surface 5A. The other side ball row 6B is rollably sandwiched between the inner raceway surface 4C formed on the hub wheel 4 and the other side outer raceway surface 2D of the outer member 2 facing the inner raceway surface 4C. That is, the one side ball row 6A and the other side ball row 6B rotatably support the hub wheel 4 and the inner ring 5 with respect to the outer member 2. In the wheel bearing device 1, a double row angular ball bearing is composed of the outer member 2, the hub wheel 4, the inner ring 5, the one side ball row 6A, and the other side ball row 6B. In the present embodiment, a double row angular ball bearing is composed in the wheel bearing device 1, yet is not limited thereto, and may be composed of a double row tapered roller bearing. Further, in the present embodiment, the wheel bearing device 1 is configured as the wheel bearing device 1 having a third generation structure in which the inner raceway surface 4C of the one side ball row 6A is formed directly on the outer circumference of the hub wheel 4. The present embodiment is not limited to this. A second generation structure in which a pair of inner rings 5 are press-fitted and fixed to the hub wheel 4, and a first generation structure which does not include the hub wheel 4 and which is composed of an outer ring which is the outer member 2 and the inner ring 5 which is an inner member may be used.

Figure 3:
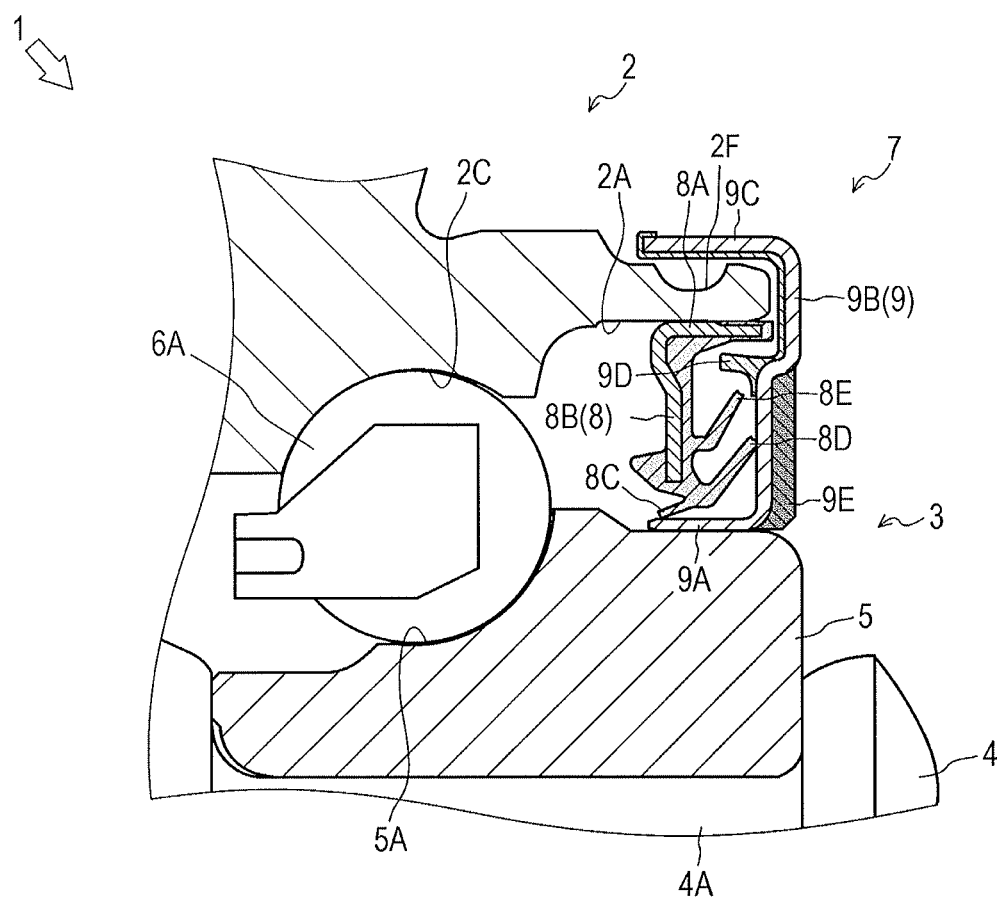
FIG. 3 is an enlarged end view showing a configuration of a seal member of the wheel bearing device according to the first embodiment of the present invention.

As shown in FIGS. 2 and 3, the one side (inner side) seal member 7 closes a gap between the one side opening portion 2A of the outer member 2 and the hub wheel 4. The one side seal member 7 includes a seal plate 8 having a substantially cylindrical shape and a slinger 9 having a substantially cylindrical shape.

As shown in FIG. 3, the seal plate 8 is composed of a metal core and a seal lip. The metal core is made of ferritic stainless steel plates (SUS430 series of JIS standards), austenitic stainless steel plates (SUS304 series of JIS standards), or cold rolled steel plates subjected to rust prevention treatment (SPCC series of JIS standards). In the metal core, the outer edge portion of an annular steel plate is bent by press working, and is formed in a substantially L shape in an axial cross-sectional view. Thereby, the metal core is composed of a seal plate fitting portion 8A having a cylindrical shape and a lip support portion 8B which has an annular shape and extends from the end toward the axial center. A sealing material is vulcanized and adhered to a fitting surface of the seal plate fitting portion 8A. A seal lip is provided on one side surface of the lip support portion 8B. The seal lip is formed by integrally vulcanizing and adhering a radial lip 8C, an inner axial lip 8D and an outer axial lip 8E. The radial lip 8C, the inner axial lip 8D and the outer axial lip 8E are made of NBR (acrylonitrile-butadiene rubber), HNBR (hydrogenation acrylonitrile-butadiene rubber) having excellent heat resistance, EPDM (ethylene propylene rubber), ACM (polyacrylic rubber) having excellent heat resistance and chemical resistance, FKM (fluororubber) or synthetic rubber such as silicone rubber. The seal plate 8 is integrally formed with the outer member 2 by fitting the seal plate fitting portion 8A into the one side opening portion 2A of the outer member 2. At this time, the seal plate 8 is disposed such that one side surface of the lip support portion 8B faces the outside of the outer member 2.

The slinger 9 is made of a steel plate equivalent to the seal plate 8. An outer edge portion and an inner edge portion of annular steel plates are bent by press working, so that the slinger 9 is formed in a substantially U shape in an axial cross-sectional view. As a result, the slinger 9 includes a radial lip contact portion 9A having a cylindrical shape, an axial lip contact portion 9B which has an annular shape and extends radially outward from the end of the radial lip contact portion 9A, and a cover portion 9C which has a cylindrical shape and extends along the axial direction from the outer edge portion of the axial lip contact portion 9B. In the slinger 9, the radial lip contact portion 9A is fitted to the inner ring 5 and is formed integrally with the inner ring 5 at a position closer to an outside of the outer member 2 than the seal plate 8. At this time, the slinger 9 formed in a substantially U shape in an axial cross-sectional view has an opening side facing the inside of the outer member 2, such that the axial lip contact portion 9B and one side surface of the lip support portion 8B of the seal plate 8 and one side end surface of the outer member 2 face each other. Further, the slinger 9 is disposed such that the inner circumferential surface of the cover portion 9C faces the outer circumferential surface of one side end of the outer member 2. The cover portion 9C of the slinger 9 covers the drainage outer groove 2F of the outer member 2 and the axial lip contact portion 9B of the slinger 9 covers one side end surface of the outer member 2. At this time, gaps are formed between the outer circumferential surface of the outer member 2 and the cover portion 9C of the slinger 9 and between the one side end surface of the outer member 2 and the axial lip contact portion 9B of the slinger 9. A magnetized body 9E which composes an encoder is provided to the axial lip contact portion 9B of the slinger 9.

In this manner, the one side seal member 7 is disposed such that the seal plate 8 fitted in the one side opening portion 2A of the outer member 2 and the slinger 9 fitted to the inner ring 5 are face each other to compose a pack seal. In the one side seal member 7, the radial lip 8C of the seal plate 8 contacts the radial lip contact portion 9A of the slinger 9 via an oil film, and the inner axial lip 8D of the seal plate 8 contacts the axial lip contact portion 9B of the slinger 9 via the oil film. On the other hand, the outer axial lip 8E of the seal plate 8 is not in contact with the axial lip contact portion 9B of the slinger 9. The one side seal member 7 is configured to be slidable with respect to the slinger 9 when the radial lip 8C of the seal plate 8 and the inner axial lip 8D contact the slinger 9 via the oil film. As a result, the one side seal member 7 prevents leakage of lubricating grease from the one side opening portion 2A of the outer member 2 and intrusion of rainwater and dust from the outside.

As shown in FIG. 2, the other side (outer side) seal member 10 closes a gap between the other side opening portion 2B of the outer member 2 and the hub wheel 4. The other side seal member 10 is formed as an integrated seal in which a seal lip is vulcanized and adhered to a metal core having a substantially cylindrical shape.

The metal core of the other side seal member 10 is made of ferritic stainless steel plates (SUS430 series of JIS standards), austenitic stainless steel plates (SUS304 series of JIS standards), or cold rolled steel plates subjected to the rust prevention treatment (SPCC series of JIS standards). In the metal core, the outer edge portion of an annular steel plate is bent by press working, and is formed in a substantially L shape in an axial cross-sectional view. The seal lip is made of NBR (acrylonitrile-butadiene rubber), HNBR (hydrogenation acrylonitrile-butadiene rubber) having excellent heat resistance, EPDM (ethylene propylene rubber), ACM (polyacrylic rubber) having excellent heat resistance and chemical resistance, FKM (fluororubber) or synthetic rubber such as silicone rubber.

In the other side seal member 10, the metal core is fitted to the other side opening portion 2B of the outer member 2. At this time, the other side seal member 10 is disposed such that the seal lip contacts a seal sliding surface 4E of the hub wheel 4. The other side seal member 10 is configured to be slidable with respect to the seal sliding surface 4E when the seal lip contacts the seal sliding surface 4E of the hub wheel 4 via the oil film. As a result, the seal lip of the other side seal member 10 prevents the leakage of the lubricating grease from the other side opening portion 2B of the outer member 2 and the intrusion of the rainwater and the dust from the outside.

The wheel bearing device 1 configured in this way is composed of the double row angular ball bearing composed of the hub wheel 4, the inner ring 5, the one side ball row 6A, and the other side ball row 6B which compose the outer member 2 and the inner member 3. The hub wheel 4 and the inner ring 5 are rotatably supported by the outer member 2 via the one side ball row 6A and the other side ball row 6B. In addition, in the wheel bearing device 1, the gap between the one side opening portion 2A of the outer member 2 and the inner ring 5 is closed by the one side seal member 7, and the gap between the other side opening portion 2B of the outer member 2 and the hub wheel 4 is closed by the other side seal member 10. As a result, the wheel bearing device 1 is configured such that the hub wheel 4 and the inner ring 5 which are supported by the outer member 2 rotate while preventing the leakage of the lubricating grease from the inside and the intrusion of the rainwater and the dust from the outside.

Next, the configuration of the seal lip of the one side seal member 7 will be described in detail with reference to FIG. 4. The seal plate 8 is disposed such that one side surface of the lip support portion 8B faces the outside of the outer member 2. The slinger 9 is disposed such that the axial lip contact portion 9B faces one side surface of the lip support portion 8B of the seal plate 8.

Figure 4:
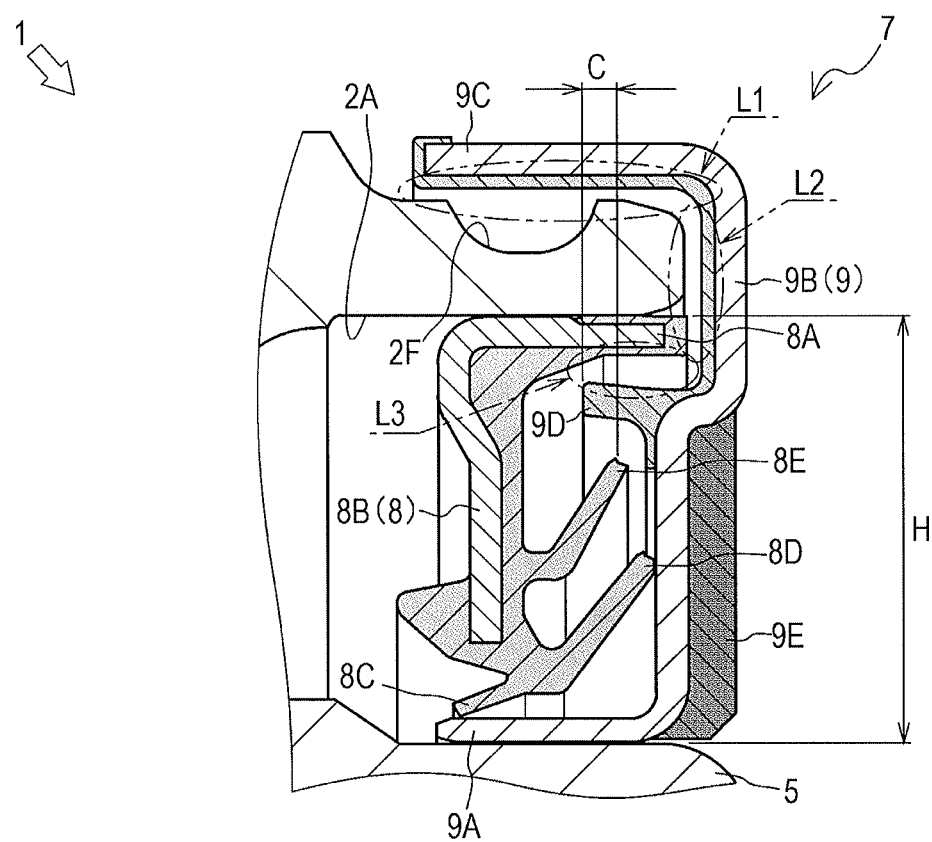
FIG. 4 is an enlarged cross-sectional view showing a labyrinth of the seal member of the wheel bearing device according to the first embodiment of the present invention.

As shown in FIG. 4, the radial lip 8C having a cylindrical shape is formed on one side surface of the lip support portion 8B of the seal plate 8 such that the diameter is reduced at a predetermined angle toward the radial lip contact portion 9A of the slinger 9. Further, the inner axial lip 8D having a cylindrical shape is formed on one side surface of the lip support portion 8B such that the diameter expands at a predetermined angle toward the axial lip contact portion 9B of the slinger 9. The outer axial lip 8E having a cylindrical shape is formed on one side surface of the lip support portion 8B closer to the side of the outer member 2 than the inner axial lip 8D such that the diameter expands at the predetermined angle toward the axial lip contact portion 9B of the slinger 9. That is, the outer axial lip 8E is disposed so as to cover the inner axial lip 8D.

The one side seal member 7 prevents the leakage of the grease inside the outer member 2 when the distal end of the radial lip 8C of the seal plate 8 contacts the radial lip contact portion 9A of the slinger 9. In addition, the one side seal member 7 prevents the intrusion of the rainwater and the dust from the outside when the distal end of the inner axial lip 8D of the seal plate 8 contacts the axial lip contact portion 9B of the slinger 9. Further, the one side seal member 7 prevents the intrusion of the rainwater and the dust from the outside when the seal plate fitting portion 8A is fitted into the opening portion of the outer member 2.

In the axial lip contact portion 9B of the slinger 9, a wall portion 9D having a cylindrical shape is formed extending toward the lip support portion 8B of the seal plate 8. The wall portion 9D is made of NBR (acrylonitrile-butadiene rubber), HNBR (hydrogenation acrylonitrile-butadiene rubber) having excellent heat resistance, EPDM (ethylene propylene rubber), ACM (polyacrylic rubber) having excellent heat resistance and chemical resistance, FKM (fluororubber) or synthetic rubber such as silicone rubber. The wall portion 9D is vulcanized and adhered to the axial lip contact portion 9B. The wall portion 9D is formed near the seal plate fitting portion 8A of the seal plate 8 and substantially parallel to the seal plate fitting portion 8A. Further, the wall portion 9D is formed in a size so as to cover the outer axial lip 8E (having at least an overlap larger than 0) when viewed from a direction perpendicular to the axial center and so as not to contact the lip support portion 8B of the seal plate 8. In the present embodiment, the outer axial lip 8E is formed such that the distal end is located at a base end (slinger 9) side by a length C compared to the distal end of the wall portion 9D. As a result, a gap which communicates with the inner axial lip 8D from the outside of the one side seal member 7 is narrowed by a passage L1 composed of the outer circumferential surface of the outer member 2 and the cover portion 9C of the slinger 9, a passage L2 composed of one side end surface of the outer member 2 and the axial lip contact portion 9B of the slinger 9, and a passage L3 composed of the seal plate fitting portion 8A of the seal plate 8 and the wall portion 9D of the slinger 9, and then is expanded in a space composed of the lip support portion 8B of the seal plate 8 and the outer axial lip 8E. In the one side seal member 7, the passage L1 and the passage L2 form a first labyrinth, and the passage L3 forms a second labyrinth. That is, in the one side seal member 7, a plurality of labyrinth structures is formed in the space from the outside to the inner axial lip 8D.

With this configuration, in the one side seal member 7 of the wheel bearing device, the wall portion 9D forms the labyrinth without changing the shapes of the seal plate 8 and the slinger 9, and the shapes of the outer axial lip 8E, the inner axial lip 8D, and the radial lip 8C. In other words, a width H (sealing cross section height) of the one side seal member 7 from the seal plate fitting portion 8A to the fitting portion of the slinger 9 need not be increased to form the labyrinth by using the space composed of the seal plate 8 and the slinger 9. In addition, the one side seal member 7 is formed such that the wall portion 9D and the outer axial lip 8E overlap by the length C. Therefore, in the one side seal member 7, the wall portion 9D guides the rainwater and the dust intruding inside from the distal end of the outer axial lip 8E to the position on the base end side by the length C. That is, the one side seal member 7 is formed such that the rainwater and the dust intruding inside hardly reach the distal end of the inner axial lip 8D by the wall portion 9D and the outer axial lip 8E. This makes it possible for the wheel bearing device 1 to form the labyrinth while maintaining the degree of freedom of design of the outer axial lip 8E, the inner axial lip 8D, and the radial lip 8C, and improve the sealing property of the one side seal member 7.

Figure 5:
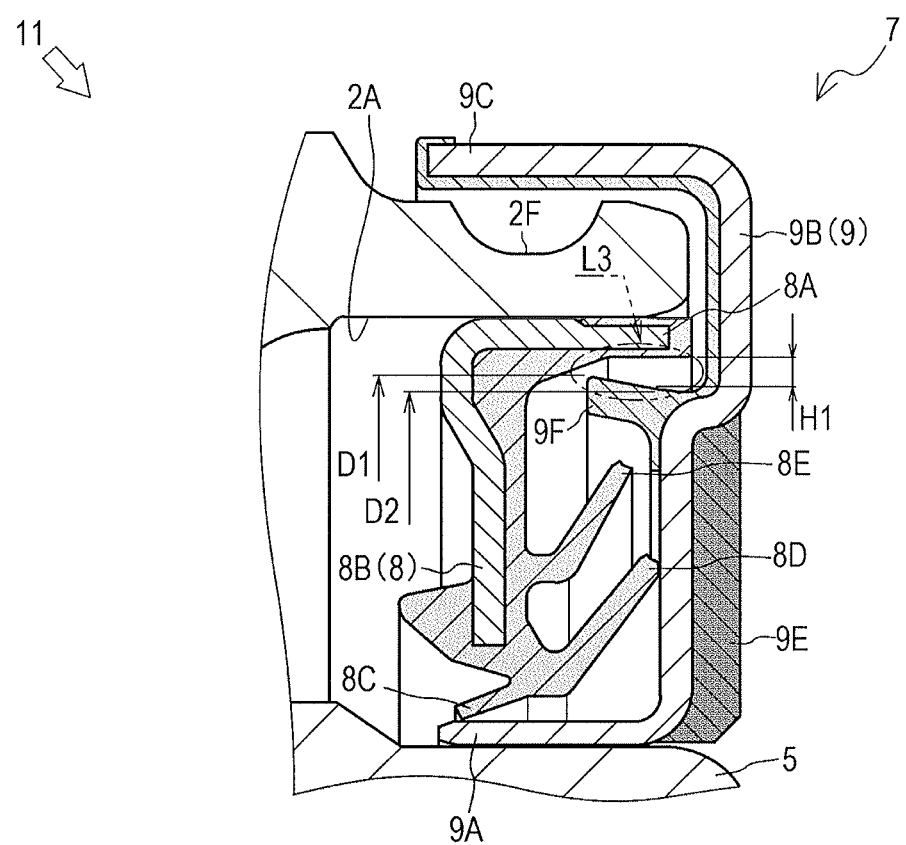
FIG. 5 is an enlarged cross-sectional view showing a labyrinth of a seal member of a wheel bearing device according to a second embodiment of the present invention.

A wheel bearing device 11 which is a second embodiment of a wheel bearing device according to the present invention will be described with reference to FIG. 5. In this regard, the wheel bearing device 11 according to the following embodiment is applied in place of the wheel bearing device 1, and names, reference numerals and symbols used to describe the wheel bearing device 1 shown in FIGS. 1 to 4 are used to indicate the same components. In the following embodiment, the same points as those of the above-described embodiments will not be described specifically, and the differences will be mainly described.

In an axial lip contact portion 9B of a slinger 9, a wall portion 9F having a cylindrical shape is formed so as to extend toward a lip support portion 8B of a seal plate 8. The wall portion 9F having a cylindrical shape is formed such that a distal end outer diameter D1 has a size equal to or larger than a base end outer diameter D2. More specifically, the wall portion 9F having a cylindrical shape is formed to be inclined with respect to the axial center in an axial cross-sectional view. That is, a passage L3 formed by a seal plate fitting portion 8A of the seal plate 8 and the wall portion 9F of the slinger 9 is formed such that a height H1 in the radial direction becomes lower toward the lip support portion 8B of the seal plate 8. As a result, the gap which communicates with an inner axial lip 8D from the outside in a one side seal member 7 is gradually narrowed by the passage L3, and then is expanded in a space composed of the lip support portion 8B and an outer axial lip 8E of the seal plate 8.

Figure 6:
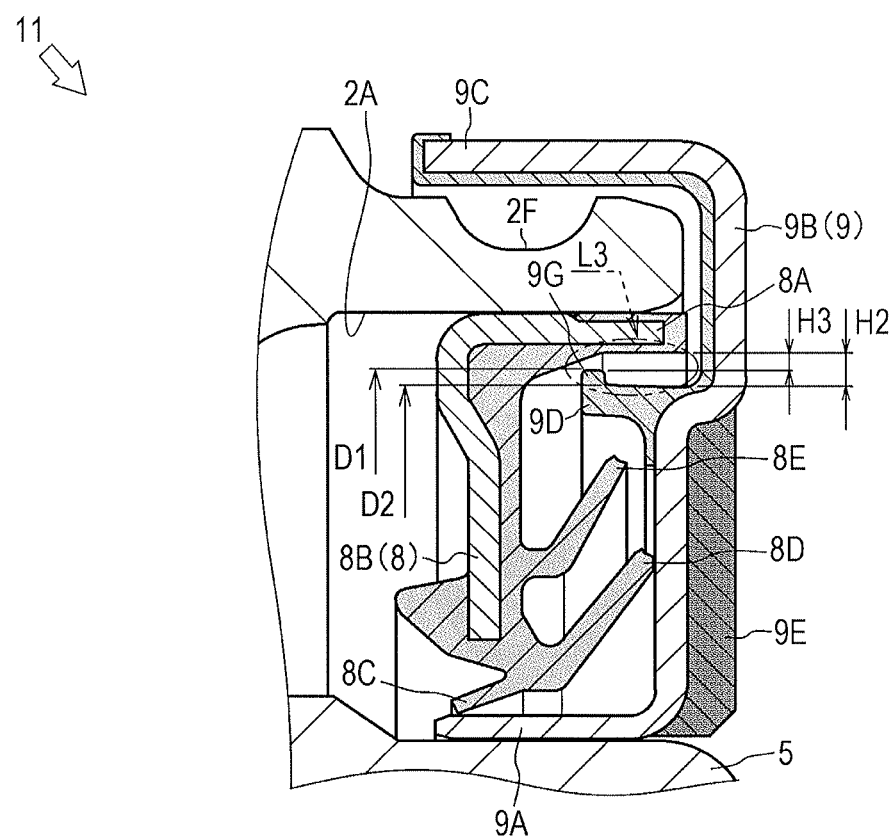
FIG. 6 is an enlarged cross-sectional view showing the labyrinth of the seal member of the wheel bearing device according to a modified example of the second embodiment of the present invention.

Further, as shown in FIG. 6, as a modified example of the wheel bearing device 11, a distal end protrusion portion 9G having an annular shape is formed such that the distal end outer diameter D1 of the wall portion 9D has a cylindrical shape and has a size equal to or larger than the base end outer diameter D2. In other words, the passage L3 composed of the seal plate fitting portion 8A of the seal plate 8 and the wall portion 9D of the slinger 9 is formed such that a height H2 in the radial direction goes down to a height H3 in the radial direction at the distal end protrusion portion 9G of the wall portion 9D. As a result, the gap which communicates with the inner axial lip 8D from the outside in the one side seal member 7 is narrowed at two stages by the passage L3, and then is expanded in a space composed of the lip support portion 8B and the outer axial lip 8E of the seal plate 8.

With this configuration, the one side seal member 7 of the wheel bearing device 11 is formed so as to expand the diameter of the wall portion 9F having a cylindrical shape. Consequently, the passage L3 which is a labyrinth is formed inclining toward the inner axial lip 8D. The height H1 in the radial direction of the passage L3 is gradually narrowed, and drainage of rainwater and muddy water which have intruded improves. In another embodiment, the distal end protrusion portion 9G which is an obstacle is formed in the passage L3 which is the labyrinth. The height H2 in the radial direction of the passage is narrowed to the height H3, and the drainage of the intruding rainwater and muddy water improves. This makes it possible for the wheel bearing device 11 to form the labyrinth while maintaining the degree of freedom of design of the outer axial lip 8E, the inner axial lip 8D, and a radial lip 8C, and improve the sealing property of the one side seal member 7.

A wheel bearing device 12 which is a third embodiment of a wheel bearing device according to the present invention will be described with reference to FIG. 7.

Figure 7:
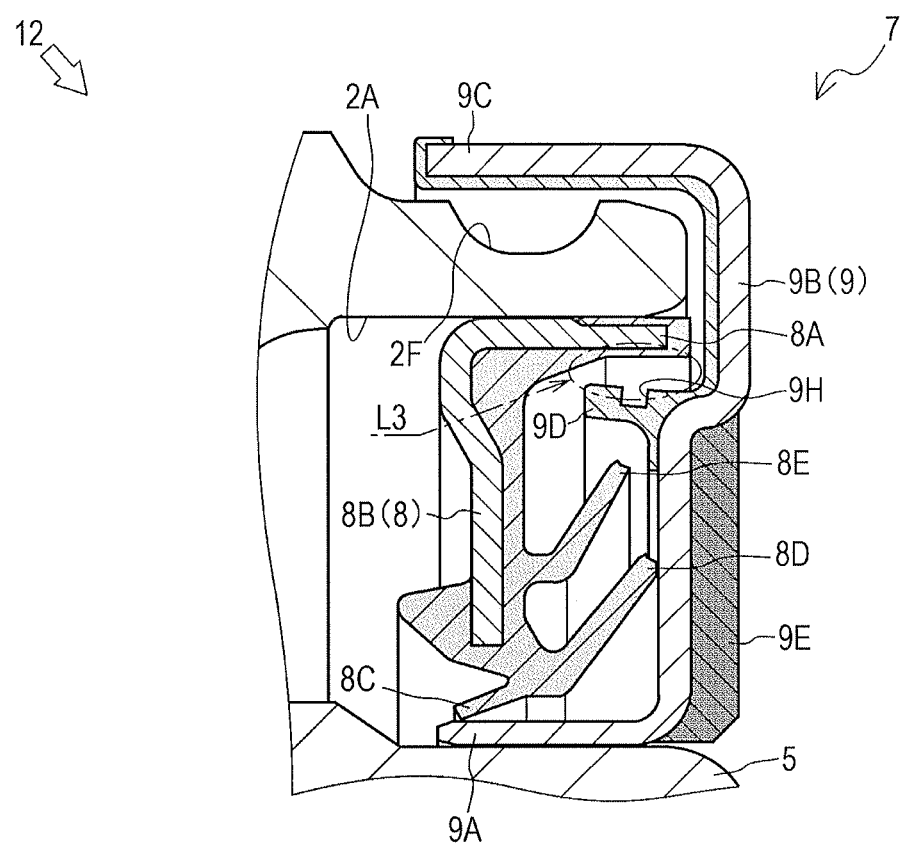
FIG. 7 is an enlarged cross-sectional view showing a labyrinth of a seal member of a wheel bearing device according to a third embodiment of the present invention.

As shown in FIG. 7, a wall portion 9D having a cylindrical shape is formed in an axial lip contact portion 9B of a slinger 9 so as to face a lip support portion 8B of a seal plate 8. The wall portion 9D is formed near a seal plate fitting portion 8A of the seal plate 8 and substantially parallel to the seal plate fitting portion 8A. Further, a groove 914 which is a recessed portion along the circumferential direction is formed on an outer circumferential surface which is the side surface of the wall portion 9D on the side of an outer member 2. The groove 9H is formed over the entire outer circumferential surface of the wall portion 9D. As a result, a gap which communicates with an inner axial lip 8D from the outside of a one side seal member 7 is narrowed by a passage L3 composed of the seal plate fitting portion 8A of the seal plate 8 and an outer circumferential surface of the wall portion 9D via the groove 9H, and then is expanded in a space composed of the lip support portion 8B of the seal plate 8 and an outer axial lip 8E.

With this configuration, the groove 9H is formed in the wall portion 9D having a cylindrical shape in the one side seal member 7 of the wheel bearing device 12, so that drainage of rainwater and muddy water intruding the passage L3, which is a labyrinth, improves. This makes it possible for the wheel bearing device 12 to form the labyrinth while maintaining the degree of freedom of design of the outer axial lip 8E, the inner axial lip 8D, and a radial lip 8C, and improve the sealing property of the one side seal member 7.

Figure 8:
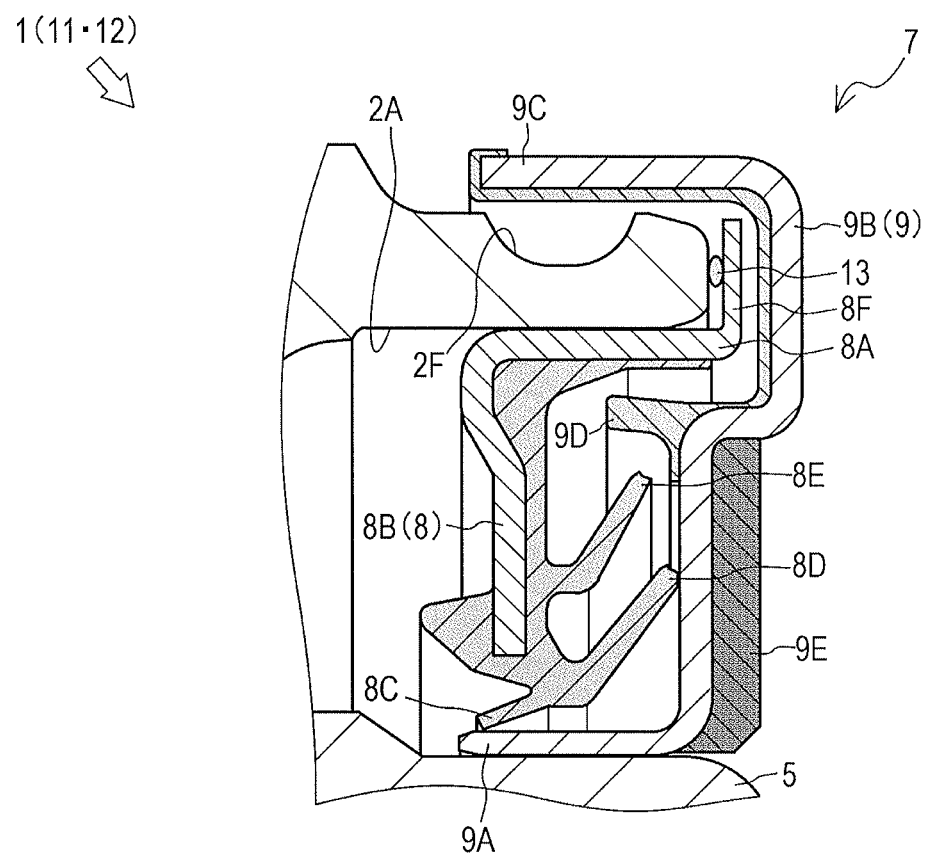
FIG. 8 is an enlarged cross-sectional view showing an O ring of the seal member of the wheel bearing device according to the modified example of the first embodiment of the present invention.

As shown in FIG. 8, in a modified example of the wheel bearing device 1 which is the first embodiment of the wheel bearing device according to the present invention, the wheel bearing device 11 which is the second embodiment, and the wheel bearing device 12 which is the third embodiment, an O ring 13 (or a sealing material) may be interposed in the seal plate fitting portion 8A of the seal plate 8 and fitted to the outer member 2. The seal plate 8 has a seal surface 8F formed by bending the end of the seal plate fitting portion 8A radially outward. The seal plate 8 is fitted into a one side opening portion 2A of the outer member 2 via the O ring 13 between the one side end surface of the outer member 2 and the seal surface 8F. With such a configuration, the one side seal member 7 can reliably prevent intrusion of the rainwater and the dust from the seal plate fitting portion 8A.

Figure 9:
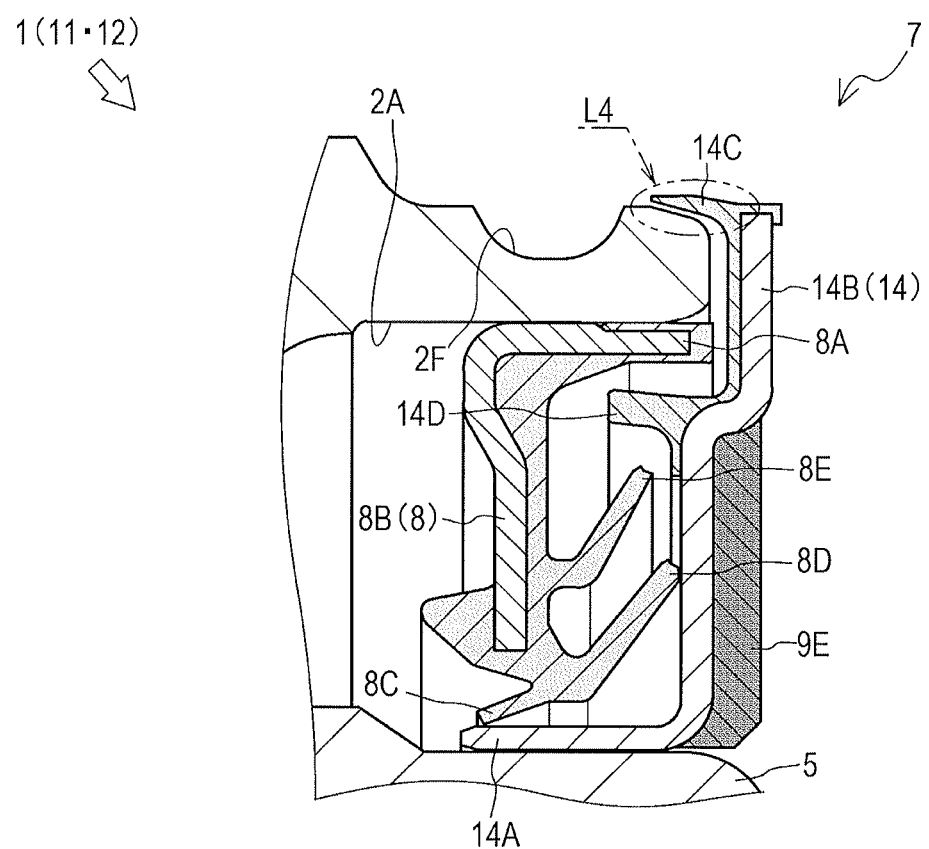
FIG. 9 is an enlarged cross-sectional view showing that the wheel bearing device according to the modified example of the first embodiment of the present invention further includes a non-contact lip of the seal member.

Further, as shown in FIG. 9, a configuration including a slinger 14 having a non-contact lip instead of the slinger 9 may be employed. An outer edge portion and an inner edge portion of annular steel plates are bent by press working, so that the slinger 14 is formed in a substantially L shape in an axial cross-sectional view. As a result, the slinger 14 is composed of a radial lip contact portion 14A having a cylindrical shape and an axial lip contact portion 14B which has an annular shape and extends radially outward from the end. The axial lip contact portion 14B of the slinger 14 is formed to have an outer diameter substantially equal to the outer diameter of the outer member 2. A non-contact lip 14C is vulcanized and adhered to the outer edge of the axial lip contact portion 14B. The non-contact lip 14C is made of a material equal in material to a radial lip 8C, the inner axial lip 8D and the outer axial lip 8E. The non-contact lip 14C is disposed so as to cover a gap between the outer member 2 and the axial lip contact portion 14B without contacting a one side end of the outer member 2. With such a configuration, the labyrinth is formed in the one side seal member 7 by a passage L4 composed of the one side end of the outer member 2 and the non-contact lip 14C of the slinger 14. Consequently, it is possible to further suppress the intrusion of the rainwater and the dust from the gap between the outer member 2 and the slinger 14, and improve the sealing property.

Figure 10:
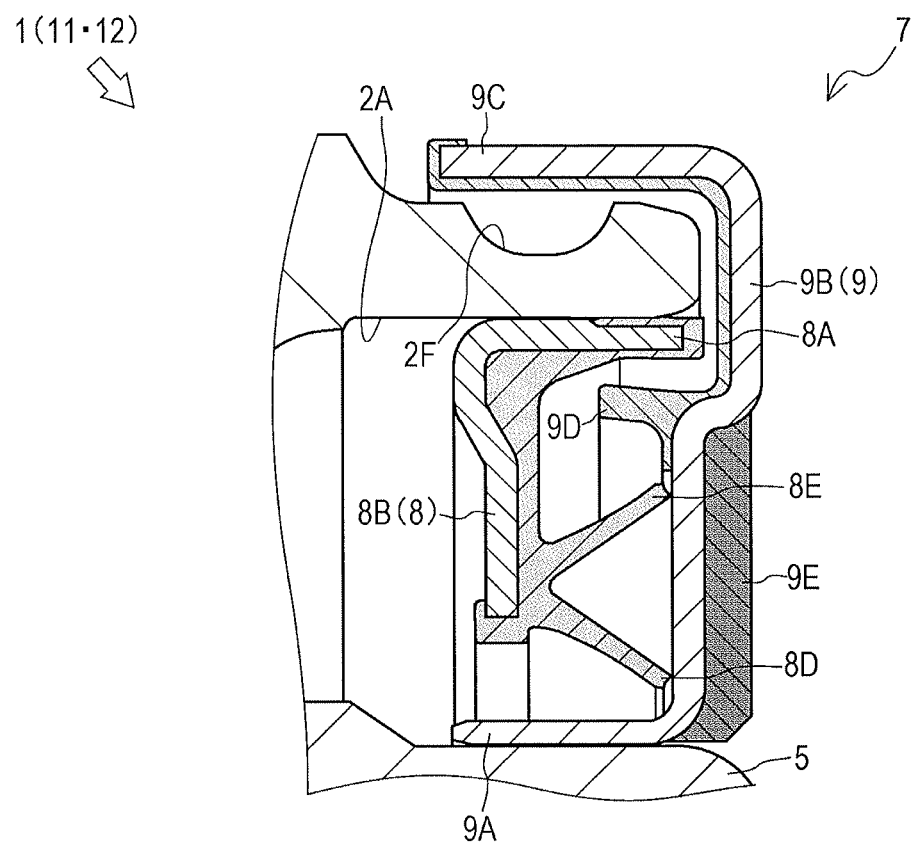
FIG. 10 is an enlarged cross-sectional view showing that the wheel bearing device according to the modified example of the first embodiment of the present invention does not include a radial seal lip of the seal member.

In addition, as shown in FIG. 10, the sealing property of the one side seal member 7 in which the labyrinth is formed is improved. Consequently, there may be a structure in which the radial lip 8C is omitted, and the inner axial lip 8D and the outer axial lip 8E are brought into contact with the axial lip contact portion 9B of the slinger. With such a configuration, the one side seal member 7 has no sliding resistance caused by contact between the radial lip 8C and the radial lip contact portion 9A of the slinger 9. Consequently, it is possible to suppress rotational torques of the wheel bearing devices 1, 11 and 12.

The embodiments of the present invention have been described above. However, the present invention is not limited to these embodiments, but are exemplary embodiments. It is a matter of course that the present invention can be further practiced in various embodiments without departing from the scope of the present invention. The scope of the present invention is indicated by the recitation of the claims, and includes the meaning equivalent to the recitation of the claims, and all changes within the scope.

INDUSTRIAL APPLICABILITY

The present invention can be used for a wheel bearing device.

DESCRIPTION OF REFERENCE SIGNS

1: Wheel bearing device
2: Outer member
2A: One side opening portion
3: Inner member
4: Hub wheel
6A: One side ball row
7: Seal member
8: Seal plate
9: Slinger

The invention claimed is:

1. A wheel bearing device comprising:
an outer member which includes double row outer raceway surfaces integrally formed on an inner circumferential surface;
an inner member which includes double row inner raceway surfaces formed on an outer circumferential surface and facing the double row outer raceway surfaces;
double row rolling elements which are rollably housed between the double row outer raceway surfaces and the double row inner raceway surfaces;
a seal member forming a seal between the outer member and the inner member, the seal member comprising a seal plate, a seal lip formed on the seal plate, and a slinger fitted to an outer circumferential portion of the inner member so as to face the seal plate,
the seal member being fitted in an opening portion of the outer member, wherein the seal lip contacts the slinger,
the slinger is formed so as to cover an end surface of the opening portion of the outer member,
the slinger is provided with a wall portion extending along an axial direction of the inner member,
the seal plate including a seal plate fitting portion contacting an inner peripheral surface of the outer member, the seal plate fitting portion having a cylindrical shape and extending along an axial direction of the inner member toward the slinger,
a labyrinth is formed between the end surface of the opening portion of the outer member and the slinger,
the wall portion is disposed between the outer member and the seal lip to form another labyrinth, and
the wall portion is made of rubber, and an outer diameter of a distal end of the wall portion is formed to have a size that is greater than an outer diameter of a base end of the wall portion,
wherein the wall portion extends from the base end to the distal end away from an axial center of the inner member in a cross-sectional view including the axial center.

2. The wheel bearing device according to claim 1, wherein an annular recessed portion or a distal end protrusion portion, along a circumferential direction, is formed on the wall portion.

3. The wheel bearing device according to claim 2, wherein the seal includes an outer axial lip and an inner axial lip, wherein a distal end of the outer axial lip is located closer to a side of the base end of the wall portion than the distal end of the wall portion, and wherein the outer and inner axial lips extend from the base end to the distal end away from the axial center of the inner member.

4. The wheel bearing device according to claim 1, wherein the seal includes an outer axial lip and an inner axial lip, wherein a distal end of the outer axial lip is located closer to a side of the base end of the wall portion than the distal end of the wall portion, and wherein the outer and inner axial lips extend from the base end to the distal end away from the axial center of the inner member.

5. The wheel bearing device according to claim 1, wherein:
an outer groove, along the circumferential direction, is formed in an outer circumferential surface of the outer member; and
the slinger includes a cover portion, which has a cylindrical shape and covers the outer groove.

6. The wheel bearing device according to claim 1, wherein an annular recess is provided in an outer peripheral surface of the wall portion.

7. A wheel bearing device comprising:
an outer member which includes double row outer raceway surfaces integrally formed on an inner circumferential surface;
an inner member which includes double row inner raceway surfaces formed on an outer circumferential surface and facing the double row outer raceway surfaces;
double row rolling elements which are rollably housed between the double row outer raceway surfaces and the double row inner raceway surfaces;
a seal member forming a seal between the outer member and the inner member, the seal member comprising a seal plate, a seal lip formed on the seal plate, and a slinger fitted to an outer circumferential portion of the inner member so as to face the seal plate, the seal member being fitted in an opening portion of the outer member, wherein the seal lip contacts the slinger, the seal plate including a seal plate fitting portion contacting an inner peripheral surface of the outer member, the seal plate fitting portion having a cylindrical shape and extending along an axial direction of the inner member toward the slinger, the slinger is formed so as to cover an end surface of the opening portion of the outer member, the slinger is provided with a wall portion having a cylindrical shape and extending along an axial direction of the inner member, a first passage is formed between the outer circumferential surface of the outer member and the cover portion of the slinger, and a second passage is formed between one side end surface of the outer member and an opposing axial lip contact portion of the slinger, wherein the first and second passages form a first labyrinth, a third passage is formed by a passage defined by the seal plate fitting portion of the seal plate and an outer circumferential surface of the wall portion of the slinger, the third passage forming a second labyrinth, wherein the third passage forming the second labyrinth communicates with an expanded space defined by a lip support portion of the seal plate and an outer axial lip of the seal plate, and the wall portion is made of rubber, and an outer diameter of a distal end of the wall portion is formed to have a size equal to or greater than an outer diameter of a base end of the wall portion.

8. The wheel bearing device according to claim 7, wherein the second passage is also formed between an end surface of the seal plate fitting portion and the opposing axial lip contact portion of the slinger.

* * * * *